(12) United States Patent
Kaikati et al.

(10) Patent No.: US 6,879,814 B2
(45) Date of Patent: Apr. 12, 2005

(54) POWER CONTROL APPARATUS, AND ASSOCIATED METHOD, FOR A SENDING STATION OF A COMMUNICATION SYSTEM

(75) Inventors: Muhammad Kaikati, Flower Mound, TX (US); Kari Saukko, Kiiminki (FI)

(73) Assignee: Nokia Corporation, Espoo (FI)

( * ) Notice: Subject to any disclaimer, the term of this patent is extended or adjusted under 35 U.S.C. 154(b) by 465 days.

(21) Appl. No.: 09/844,109

(22) Filed: Apr. 27, 2001

(65) Prior Publication Data

US 2002/0160821 A1 Oct. 31, 2002

(51) Int. Cl.[7] .................................................. H04B 7/00
(52) U.S. Cl. ..................... 455/127.1; 455/126; 455/69; 455/522
(58) Field of Search .............................. 455/522, 127.1, 455/126, 69, 115; 330/280, 279; 370/311, 318

(56) References Cited

U.S. PATENT DOCUMENTS

| 4,045,707 | A | * | 8/1977 | Gernot et al. ............... 315/106 |
| 6,169,886 | B1 | * | 1/2001 | Black et al. ............. 455/127.2 |
| 6,343,218 | B1 | * | 1/2002 | Kaneda et al. ............. 455/522 |
| 6,600,772 | B1 | * | 7/2003 | Zeira et al. ................. 375/130 |

* cited by examiner

*Primary Examiner*—Charles Appiah
*Assistant Examiner*—Joy K. Contee (57) ABSTRACT

Apparatus, and an associated method, for controlling the power levels at which an EDGE-modulated signal, or other signal which includes envelope varying-portions, during operation of a communication system. Changes in the power levels of the EDGE-modulated signal are permitted when closed-loop power control is done on nonamplitude-modulated component portions of the signal. Changes in the power levels of the EDGE-modulated signal are prevented by open-loop power control on amplitude-modulated component portion of the signal.

15 Claims, 4 Drawing Sheets

POWER CONTROL APPARATUS, AND ASSOCIATED METHOD, FOR A SENDING STATION OF A COMMUNICATION SYSTEM

The present invention relates generally to a manner by which to effectuate power control over transmit signals generated at a sending station, such as a base transceiver station of a cellular communication system. More particularly, the present invention relates to power-control apparatus, and an associated method, by which to control the power levels of an EDGE (enhanced data rate for GSM evolution)-modulated signal, or other signal which includes an amplitude-modulated component portion. Changes in power levels of the transmit signal are permitted when closed-loop power control is done on non-amplitude-modulated component portions of the signal. And, changes in power level of the transmit signal are prevented by open-loop power control on amplitude-modulated component portions of the signal.

BACKGROUND OF THE INVENTION

A communication system is formed, at a minimum, of a sending station and a receiving station. The sending and receiving stations are interconnected by way of a communication channel. Information to be communicated by the sending station is sent upon the communication channel by the sending station to the receiving station. A wide variety of different types of communication systems have been developed and implemented to effectuate communication of information between sending and receiving stations.

Advancements in communication technologies have permitted the development of new types of communication systems as well as improvements to existing types of communication systems. A radio system is exemplary of a type of communication system which has benefited from advancements in communication technologies. In a radio communication system, the communication channel which interconnects the sending and receiving stations is formed of a radio link defined of a portion of the electro-magnetic spectrum. Because a radio link is utilized to form the communication channel, a physical connection, conventionally required in a conventional wireline communication system, is obviated.

Because the communication channel is formed upon a radio link in a radio communication system, increased communication mobility is inherently provided in a radio communication system in contrast to that permitted in a conventional wireline communication system. Because a wireline connection is not required to be formed between the sending and receiving stations to permit the communication of information therebetween, communications are permitted at, and between, locations at which formation of a wireline connection would not be possible. Additionally, infrastructure costs associated with a radio communication system are generally less than those associated with a conventional wireline system as radio links are utilized to form communication channels rather than fixed wireline connections.

A cellular communication system is exemplary of a radio communication system which has been made possible due to advancements in communication technologies. A cellular communication system advantageously provides for radio communications with mobile stations to permit telephonic communication therewith. A cellular communication system also makes relatively efficient utilization of the portion of the electromagnetic spectrum allocated thereto and upon which radio channels are defined. The relatively efficient utilization of the allocated electromagnetic spectrum is provided through the installation of a plurality of spaced-apart, fixed-site transceivers installed throughout a geographical area to be encompassed by the cellular communication system. Because of the spaced-apart positioning of the fixed-site transceivers, referred to as base transceiver stations (BTSs), only relatively low-power signals need to be communicated between a base transceiver station and a mobile station. Because of the relatively low-power levels in which the signals are transmitted, the same radio channels can be reused at different locations throughout the cellular communication system as the low power levels of the signal permit reuse of the same channel according to a cell reuse scheme.

Various standards have been promulgated relating to various types of cellular communication systems. The GSM (global system for mobile communications) is exemplary of a standard which sets forth operational parameters for a cellular communication system which utilizes TDMA (time division multiple access) communication techniques. In a GSM system, channels are defined in terms of frequency and a time slot. Each channel is divided into frames, and the frames are further divided into time slots. Therefore, a TDMA communication scheme permits increased communication capacity in contrast with a communication scheme which utilizes conventional analog communication techniques as the bandwidth allocated to communicate thereon is more efficiently utilized.

Power control of communication signals transmitted in almost any communication system is important to reduce the possibility that the communication signal might interfere with another concurrently-generated communication signal. The GSM standard sets forth power control requirements for sending stations operable in a GSM communication system. Conventionally, base transceiver stations operable in a GSM communication system utilize a closed-loop power control scheme in which the power levels at which signals transmitted by a base station are sampled and corrected, as appropriate.

By effectuating power control, the possibility that a too-powerful signal is transmitted to cause co-channel, or other, interference is reduced. And, by effectuating power control, the possibility that a too-weak signal is transmitted to prevent recovery of the informational content of the signal at the receiving station is reduced.

Some GSM systems also provide for packet-based communications. GPRS (general packet radio service), e.g., is implemented in some GSM systems. GPRS messaging utilizes a GMSK (gaussian minimum shift keying) modulation technique. Such a modulation technique is also utilized during the communication of circuit-switched communications.

Incorporation of a higher data rate scheme into GSM systems, referred to as EDGE (enhanced data rates for Global evolution), has been proposed. And EDGE-modulated signal is formed by utilizing 8 PSK (8-phase shift keying) modulation. During the useful part a burst of an EDGE-modulated signal, the signal includes an amplitude modulated component.

When a conventional, GSM power control scheme is utilized to control the power levels at which an EDGE-modulated signal is transmitted, the amplitude modulation interferes with power-control operations. That is to say, a reference signal having the same amplitude modulated component corresponding to the output power levels of the EDGE modulated signal is difficult to match with the detected output signal due to delays and non-linearity associated with formation of the final, output signal at the base transceiver station. As the level of both the reference signal and the output signal subsequent to amplification are unlikely to be identical, the output power levels of output signals generated at the sending station is susceptible to drift due to the inaccuracy of the loop.

A manner by which to better effectuate power control over EDGE-modulated signals, or other amplitude-modulated signals would facilitate improved power control and, correspondingly, permit improved communication system performance.

It is in light of this background information related to the effectuation of power control in a communication system that the significant improvements of the present invention have evolved.

SUMMARY OF THE INVENTION

The present invention, accordingly, advantageously provides apparatus, and an associated method, by which to effectuate power control over transmit signals generated at a sending station, such as a base transceiver station of a cellular communication system.

Through operation of an embodiment of the present invention, a manner is provided by which to control the power levels of an EDGE (enhanced data rate for GSM evolution)-modulated signal, or other signal which includes an amplitude modulated component portion.

In one aspect of the present invention, changes in the power levels of a transmit signal are permitted when closed-loop power control measurements is done on nonamplitude-modulated component portions of the signal. And, changes in power levels of the transmit signal are prevented by open-loop power control on amplitude-modulated component portions of the signal.

In another aspect of the present invention, a manner is provided by which to effectuate closed-loop power control upon a send signal to be sent by a sending station in a communication system in which the send signal includes an amplitude modulated component portion. Detection is made of the power levels of the signal, subsequent to amplification at the sending station. Indications of the detection are compared with the control signal. Responsive to comparisons between the indications of the power levels of the send signal, subsequent to amplification at the sending station, and the control signal, a power-up, or a power-down, command signal is generated. In control theory, the command signal is sometimes referred to as a difference signal or an error signal. The command signal is selectably applied to circuitry of the sending station to cause appropriate alteration of the power levels at which the send signal is generated.

A switch element is positioned between the comparator which performs the comparisons and the part of the control circuitry which integrates the comparison signals and which in turn control the circuitry of the sending station at which the signal to be sent by the sending station is to be amplified. Depending upon the position of the switch element, the command signal is either applied to the integration circuitry allowing changes in output signal power or is prevented from been applied thereto and therefore disallowing changes in power level. A switch control signal controls the switch element either to pass the command signal or to prevent its passage. The switch control signal is of a value to cause the switch element to be in a closed position when the indications of the power levels of the send signal, when applied to a comparator for comparison with values of a power control signal, do not include in the amplitude component portion. Conversely, when the comparisons made between the indications of the power levels of the send signal and the power control signal are made during the amplitude modulated component portion of the send signal, the switch position is caused to be in the open position, and the power change command signal is not applied to the circuitry of the sending station to alter the power levels of the send signal.

In another aspect of the present invention, the control signal used for purposes of comparison with the indications of the power levels of the send signal is of a time-varying value. The control signal includes a ramp-up portion, a ramp-down portion, and a center position therebetween. The maximum and minimum values of the power control signal and also the ramp-up and ramp-down slopes correspond to a desired signal level. And, the power-up and power-down command signals are generated to cause the power levels of the send signal to correspond with the corresponding power level signals of the control signal.

In one implementation, power control is effectuated at a base transceiver station of a GSM cellular communication system, which provides for EDGE-modulated signals. The EDGE-modulated signals are sent in bursts in manners defined in the appropriate GSM specification which relates to EDGE-modulated signals. Power control is effectuated during time periods corresponding to the non-amplitude-modulated portions of the signal. Portions of the EDGE-modulated signals which are amplitude-modulated, viz., the time periods during which the EDGE-modulated signal includes an information component, are not used to effectuate power control. Thereby, power control command signals, based upon amplitude-modulated portions of the EDGE-modulated signal are not used to effectuate power control. And, because power control is effectuated during the ramp-up and ramp-down portions of the EDGE-modulated signal, the effectuation of power control of the signal sent by the base transceiver station is ably effectuated.

In these and other aspects, therefore, apparatus, and an associated method, is provided for a communication system having a sending station operable to send a burst data signal upon a communication channel during at least a selected interval. The burst data signal includes an envelope-varying component portion and an envelope-nonvarying component portion. Power control apparatus, and an associated method, controls the power levels at which the burst data signal is sent. A comparator is coupled to receive indications of actual power levels at which the burst data signal is sent. The comparator compares values of the indications of the actual power levels with values of specified power levels. The comparator generates a power-level change command signal responsive thereto. A power-change effectuator is coupled to the comparator. The power change effectuator is at least selectably operable to permit effectuation of the change in the actual power levels at which the burst data signal is sent. The power change effectuator is operable to permit effectuation of changes of the actual power levels at which the burst data signal is sent when the indications of the actual power levels at which the burst data signal is sent and to which the comparator is coupled to receive are of the envelope-nonvarying portion of the burst data signal.

A more complete appreciation of the present invention and to the scope thereof can be obtained from the accompanying drawings which are briefly summarized below, the following detailed description of the presently-preferred embodiments of the invention and the appended claims.

DETAILED DESCRIPTION OF THE INVENTION

Figure 1:
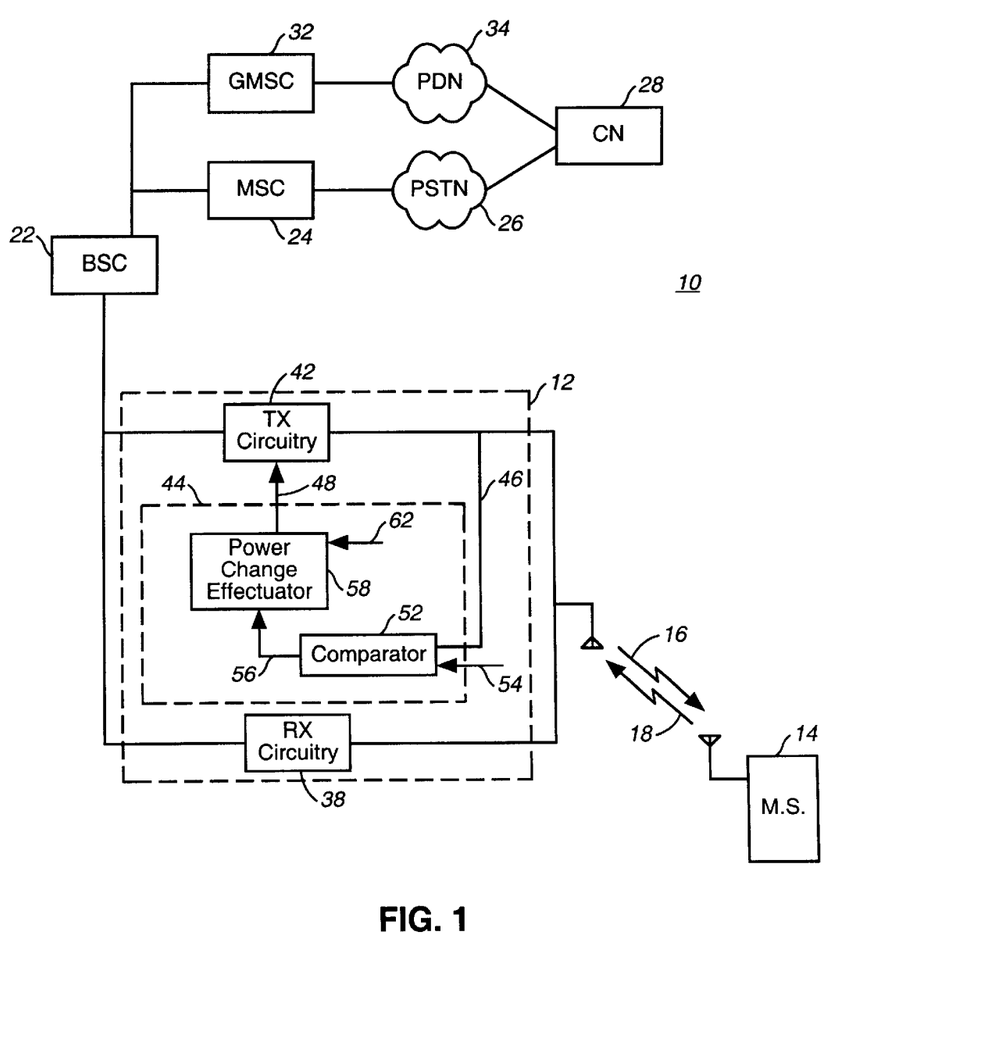
FIG. 1 illustrates a functional block diagram of a communication system in which an embodiment of the present invention is operable.

Referring first to FIG. 1, a communication system, shown generally at 10, provides for radio communications between two communication stations, here a base transceiver station (BTS) 12 and a mobile station 14. Radio links are formed between the base station and the mobile station, and communication channels are defined thereupon. Communication signals are communicated between the base station and mobile station upon the communication channels.

In the exemplary implementation shown in the figure, the communication system 10 forms a cellular communication system operable generally pursuant to a GSM (global system for mobile communications) specification which provides for EDGE (enhanced data rates for GSM evolution) communications. It should be understood at the outset, however, that operation of an embodiment of the present invention is similarly also possible in other types of radio, and other, communication systems by which to effectuate power control. Therefore, while the following descriptions shall describe operation of an embodiment of the present invention with respect to a GSM system which provides for EDGE communications, operation of an embodiment of the present invention can analogously be described with respect to any of various other types of communication systems to effectuate power control therein.

In operation of the communication system, two-way communications are permitted between the base transceiver station and the mobile station. Forward link signals, generated by the base station, are communicated to the mobile station by way of forward link formed therebetween. And, reverse link signals, generated at the mobile station, are communicated to the base station by way a reverse link formed therebetween. The forward link is indicated by the arrow 16 in the figure, and the reverse link is represented in the figure by the arrow 18 in the figure.

While only a single mobile station 14 is represented in the figure, in an actual cellular communication system, a plurality of mobile stations are typically operated simultaneously to effectuate concurrent communication sessions between individual ones of the mobiles stations and the base station 12. The power levels of signals generated pursuant to the communication sessions must be controlled to prevent their generation from interfering with the communication of other concurrently-generated communication signals.

Operation of an embodiment of the present invention provides a manner by which to control better the power levels of signals generated pursuant to communications of burst data, such as an EDGE signal, which includes a modulated portion which causes the envelope of the communicated signal to have a time-varying component. While the following description shall describe operation of the exemplary implementation in which power control is effectuated at the base station 12 to control the power levels of a data burst, operation of an embodiment of the present invention can analogously be implemented at any sending station operable to send a communication signal which includes an envelope-varying portion and an envelope non-varying portion.

The base transceiver station 12 is here shown to be coupled to a base station controller (BSC) 22. The base station controller is operable, amongst other things, to control operation of the base transceiver station. The base station controller, in turn, is coupled to a mobile switching center (MSC) 24. And, the mobile switching center is coupled to a public-switch telephonic network (PSTN) 26. A correspondent node (CN) 28 is coupled to the PSTN. A communication path is formable between the correspondent node and the mobile station to permit communications to be effectuated therebetween.

The base station controller is further shown to be coupled to a GMSC (gateway mobile switching center) 32. The GMSC is coupled to a packet data backbone 34, such as the internet backbone. And, the correspondent node 28 is further shown to be coupled to the packet data backbone. A communication path is formable between the correspondent node and the mobile station also to permit packet data communications to be effectuated with the mobile station. The correspondent node is here representative of a station at which a data burst is originated to be communicated by way of the base station 12 (at which the data burst is modulated) and the forward link 16 to the mobile station. During operation of an embodiment of the present invention, the power levels at which the burst of EDGE-modulated data is transmitted is selectably controlled during nonenvelope-modulated portions of the data burst. Power control is not effectuated during envelope-modulated portions of the EDGE-modulated signal.

The base transceiver station includes a receive portion formed of receive circuitry 38 operable to receive reverse link signals transmitted by way of the reverse link 18 to the base station. And, the base station also includes a transmit portion formed of transmit circuitry 42. The transmit circuitry is operable to transmit forward link signals upon the forward link 16 to the mobile station.

Apparatus, shown generally at 44 of an embodiment of the present invention is coupled to the transmit circuitry of the base station to selectably effectuate power control over EDGE-modulated data burst to be transmitted by the base station. The apparatus is coupled in a feedback arrangement with the circuitry 42. That is to say, the apparatus 44 is coupled by way of the line 46 to receive indications of the transmit-level signals generated by the transmit circuitry. And, the link 48 is coupled to the transmit circuitry to provide a power change effectuation signal to effectuate the change in power levels of the signals to be generated by the transmit circuitry.

Operation of the apparatus 44 causes generation of the power change effectuation signal when the indications of the power levels provided to the apparatus 44 by way of the line 46 are of burst data portions which exhibit nonvarying envelopes. During times when envelope-varying portions of the burst data signal are transmitted, the power change effectuation signal is not used to effectuate power control.

The apparatus 44 is here shown to include a comparator 52 coupled to receive the indications generated on the line 46 and also to receive a power control signal by way of the line 54. The power control signal is of time varying values which correspond to the values permitted by the specification standard pertaining to EDGE-modulated signals of the GSM system. The comparator 52 is operable to compare the values provided thereto by way of the lines 46 and 54 and to generate a power level change command signal on the line 56 responsive to comparisons made thereat. The power level change command signal is of a value to indicate that power levels of the transmit-level signal generated at the output of the transmit circuitry should be increased, or decreased, in level.

The line 56 is coupled to a power change effectuator 58. The power change effectuator is also coupled to receive a power change effectuation signal on the line 62. The value of the power change effectuation signal 62 determines whether the power change effectuator 58 passes the power level change command signal generated on the line 56. When the effectuator passes the signal, the signal is applied, by way of the line 48, to the transmit circuitry 42. In the exemplary implementation, noted below with respect to FIG. 2, the signal is first integrated, and then applied to the transmit circuitry 42. During operation of an embodiment of the present invention, a power change effectuation signal is synchronized with the data burst communicated by the transmit circuitry 42 such that the power level change command signal is permitted to be applied to the transmit circuitry during nonvarying envelope portions of the data burst. When envelope-varying portions, i.e., the information-containing portions, of the data burst are communicated, the power change effectuator prevents the power level change command signals from effecting the power level at which the communication signal is transmitted.

Figure 2:
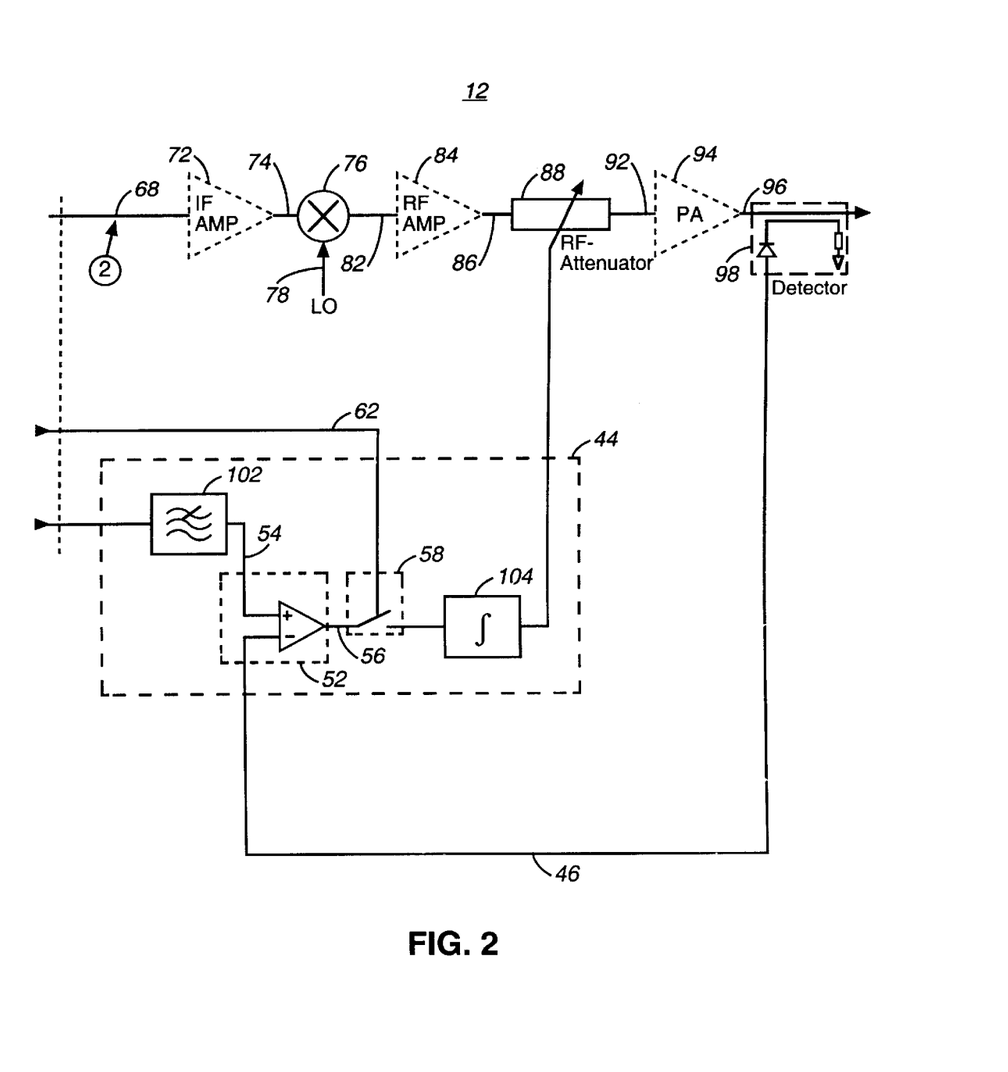
FIG. 2 illustrates a partial functional-block, partial circuit-schematic, diagram of a portion of a sending station forming part of the communication system shown in FIG. 1 and at which an embodiment of the present invention is implemented.

FIG. 2 illustrates portions of the transmit circuitry 42 and the apparatus 44, shown in FIG. 1 to form portions of the base transceiver station 12. Here, an EDGE-modulated, IF (intermediate frequency) signal is provided on the line 68 to an IF (intermediate frequency) amplifier 72. The IF amplifier is operable to amplify the signals applied thereto on the line 68 and to generate an IF-amplified signal on the line 74. The line 74 is coupled to a first input of a mixer circuit 76, and an up-mixing signal is provided to a second input of the mixer circuit 76 on the line 78. The up-mixer circuit generates and up-mixed signal on the line 82. The up-mixed signal is of a radio frequency (RF).

The line 82 is coupled to an input terminal of an RF (radio frequency) amplifier 84. The amplifier amplifies the up-mixed signal applied thereto and generates an RF-amplified signal on the line 86. The line 86 is coupled to an RF (radio frequency) variable attenuator. The variable attenuator is operable to attenuate the power level at which the signal generated on the line 86 by the RF-amplifier exhibits. The signal formed by the attenuator is provided, by way of the line 92 to a power amplifier 94. The power amplifier 94 amplifies the signals applied thereto to a transmit power-level, and the transmit-level signal resulting therefrom is generated on the line 96.

The apparatus 44 coupled to the transmit circuitry 42 is again shown to include the comparator 52 and the power change effectuator 58. The comparator 52 is coupled to the lines 46 and 54 and is operable to generate comparison results on the line 56 responsive to comparisons between the signals generated on the lines 46 and 54. The line 46 is here shown to be coupled to a negative input terminal of the comparator. The line 46 contains indications of values of the transmit-level energy of the data burst generated on the line 96.

A detector assembly 98 is also shown in the Figure. The detector assembly detects the values of the transmit power levels and indications of the detections are generated on the line 46. The power control signal generated on the line 54 comprises a power reference signal filtered by the filter 102. The comparison results of the comparison forms the power level change command signal, generated on the line 56, are provided to the power change effectuator 58.

The power change effectuator here comprises a switch element, positionable alternately in an open position and in a closed position and an integrator 104. The switch position of the switch element is determined by the value of the power change effectuator signal provided by way of the line 62 to the power change effectuator.

In the exemplary implementation the power change signal generated on the line 62 is of a binary value, of a first value to cause closing of the switch and of a second value to cause opening of the switch. When the switch position of the switch element is closed, the power level change command signal generated on the line 56 is passed through the switch element. The signal is then integrated by the integrator 104, and thereafter applied to the RF attenuator 88. The integrator operates to accumulate values of the signal applied thereto. In other implementations, other structure, e.g., a low pass filter, is instead utilized. Responsive to the value of the power level change command signal, the level of the attenuation of the attenuator 88 is selected. And, the level of attenuation by which the signal provided to the attenuator on the line 86 is attenuated is determinative of the power levels of the signal generated by the power amplifier 94 on the line 96.

Figure 3:
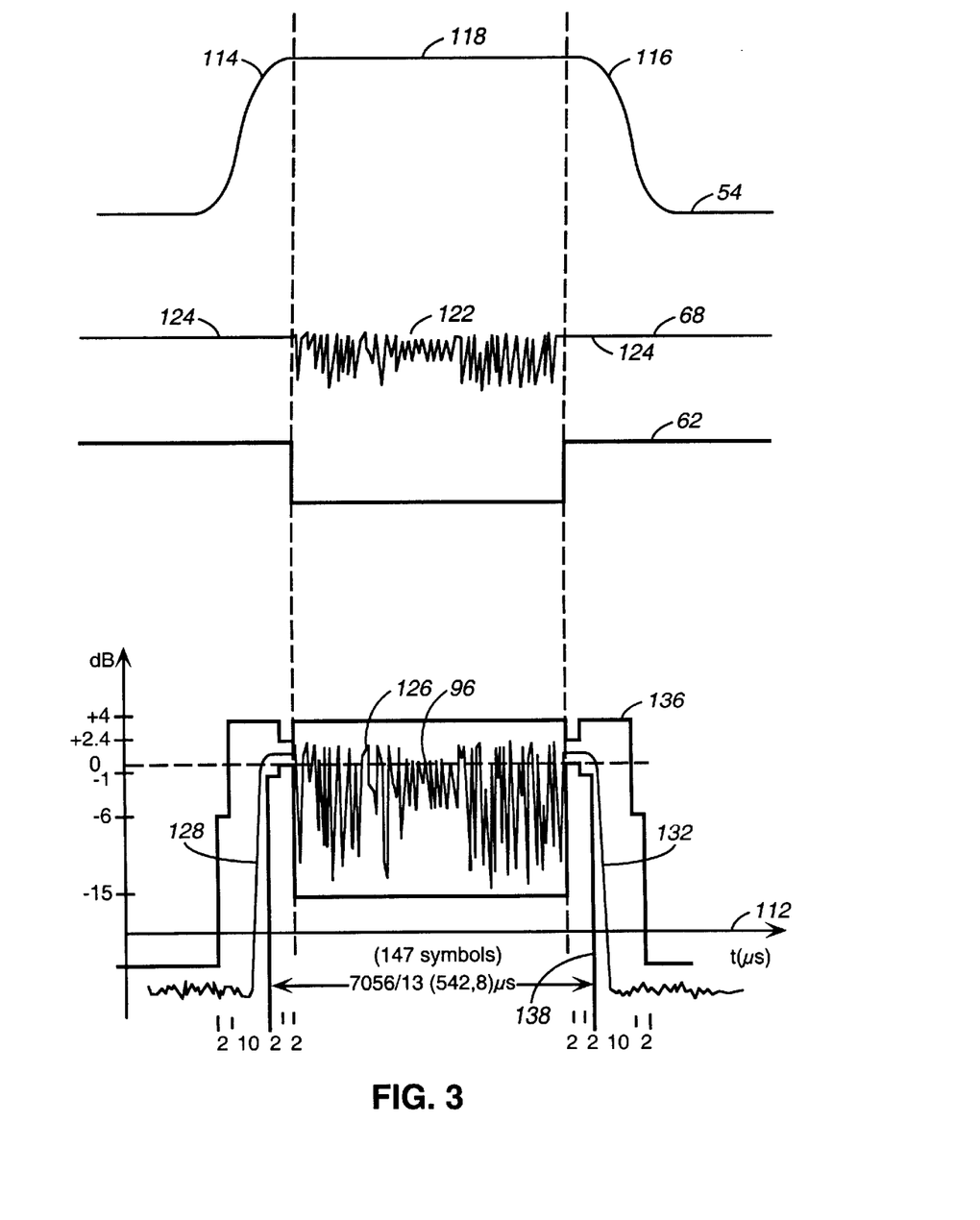
FIG. 3 illustrates a series of graphical representations of exemplary signals generated at various locations of the structure shown in FIG. 2 during a common time-line.

FIG. 3 illustrates a series of wave forms plotted as a function of time along the abscissa axis 112. The timing of the signals of which the wave forms are representative ensure that the power level change command signal is applied to the RF attenuator during non-varying envelope portions of the data burst and the power level change command signal is prevented from being applied to attenuator during envelope varying portions of the data burst. Reference numerals utilized in the figure correspond to the lines (shown in FIG. 2) upon which the signals are generated.

The wave form 54 is representative of the power control signal provided to one of the input terminals of the comparator 52. The values of the power control signal define ramp-up and ramp-down portions 114 and 116, respectively, and a central portion 118. The values of the ramp-up and ramp-down portions and the central portion are representative of desired output power levels to be exhibited at the line 96, exclusive of modulated information. The wave form 68 is representative of an EDGE-modulated signal, at an intermediate frequency level. Here, the wave form is shown to include an envelope varying portion 122 and envelope nonvarying portions 124.

The wave form 62 is representative of values of the power change effectuation signal applied to the switch forming the power change effectuator 58. The wave form is of a value of a logical "ONE" or of a logical "ZERO". When the signal 62 is of a logical ONE value, the switch element is caused to be in a closed position. And, when the signal 62 is of a logical ZERO value, the switch element is caused to be in a open position.

The wave form 96 is representative of an EDGE-modulated signal of transmit-power energy levels. The wave form includes an envelope varying portion 126 and ramp-up and ramp-down portions 128 and 132. A mask formed of upper-bound values 136 and lower-bound values 138 define a region of allowable values of the wave form 96.

Analysis of the various wave forms indicate that, when envelope-varying portions 126 of the wave form 96 are generated, the value of the power change effectuation signal 62 is of a logical ZERO value, thereby to prevent the application of the power level change command signal to cause power level change of the transmit-level signal 96. Conversely, during envelope nonvarying portions of the wave form 96, such as during the portions 128 and 132 thereof, power control is effectable.

Figure 4:
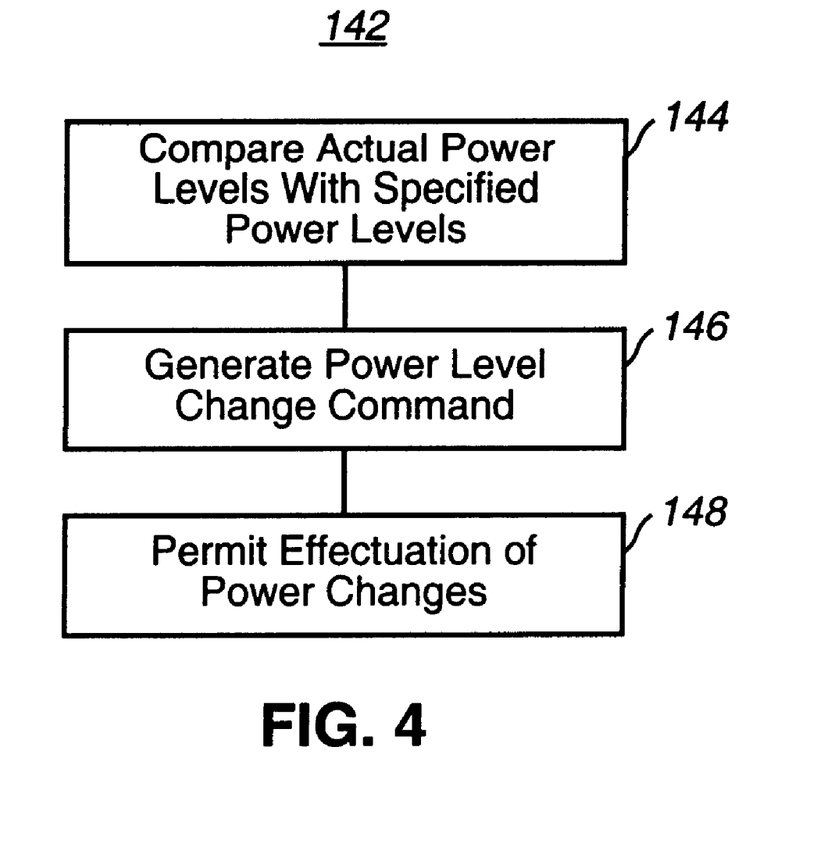
FIG. 4 illustrates a method flow diagram representative of the method of operation of a method of an embodiment of the present invention.

FIG. 4 illustrates a method, shown generally at 142, of an embodiment of the present invention. The method 142 controls power levels at which a burst data signal is sent by a sending station operable to send the burst data signal upon a communication channel during at least a selected interval.

First, and as indicated by the block 144, values of indications of actual power levels at which the burst data signal is sent are compared with values of specified power levels. Then, and as indicated by the block 146 a power level change command is generated responsive to the comparisons.

Then, and as indicated by the block 148, effectuation of changes of the actual power levels at which the burst data signal is sent is selectably permitted.

Thereby, a manner is provided by which to control the power levels of an EDGE-modulated signal, or other signal, which includes an amplitude modulated component portion. Changes in the power levels of the signal are permitted when closed-loop power control is done on non-amplitude-modulated component portions of the signal.

The previous descriptions are of preferred examples for implementing the invention, and the scope of the invention should not necessarily be limited by this description. The scope of the present invention is defined by the following claims.

What is claimed is:

1. In a communication system having a sending station operable to send a burst data signal upon a communication channel during at least a selected interval, the burst data signal including an envelope varying component portion and an envelope nonvarying component portion, the communication system operable pursuant to a system operational specification that defines time-varying power-level values permitted of the burst data signal, an improvement of power control apparatus for controlling power levels at which the burst data signal is sent, said power control apparatus comprising:

a comparator coupled to receive indications of actual power levels at which the burst data signal is sent, said comparator at least selectably operable for comparing values of the indications of the actual power levels with values of a power control signal, the power control signal of values corresponding to the time-varying power-level values permitted of the burst data signal, the power control signal formed of a first signal portion and a second signal portion, the first signal portion of a first range of time-varying values and the second signal portion of a second range of time-varying values, and for generating a power-level change command signal responsive thereto; and a power-change effectuator coupled to said comparator, said power change effectuator at least selectably operable to permit effectuation of change in the actual power levels at which the burst data signal is sent, said power change effectuator operable to permit effectuation of changes of the actual power levels at which the burst data signal is sent when the indications of the actual power levels at which the burst data signal is sent to which said comparator is coupled to receive are of the envelope-nonvarying portion of the burst data signal.

2. The apparatus of claim 1 wherein the first signal portion of the power control signal of which said comparator is coupled to receive comprises a power ramp-up subportion and a power ramp-down subportion and wherein the second signal portion of the power control signal of which said comparator is coupled to receive comprises a data portion.

3. The apparatus of claim 1 wherein said power-change effectuator is time-synchronized to the power-level values permitted of the burst data signal, the power-level values of the burst data signal permitted to be of a first range of values during the envelope-nonvarying portion of the burst data signal and the power-level values of the burst data signal permitted to be a second range of values during the envelope-varying portion of the burst data signal.

4. The apparatus of claim 3 wherein the power control signal to which said comparator is coupled to receive is time-synchronized to operation of said power-change effectuator.

5. The apparatus of claim 4 wherein said power-change effectuator is selectably operable responsive to values of a power-change effectuation signal applied thereto, the power-change effectuation signal time-synchronized to the power control signal.

6. The apparatus of claim 1 wherein said power-change effectuator comprises a switch selectably operational to permit effectuation of the changes of the actual power levels at which the burst data signal is sent when the indications of the actual power levels at which the burst data signal is sent are of the envelope-nonvarying portion of the burst data signal.

7. The apparatus of claim 6 wherein said switch is alternately positionable to prevent effectuation of the changes of the actual power levels at which the burst data signal is sent when the indications of the actual power levels at which the burst data signal is sent are of the envelope-varying portion of the burst data signal.

8. The apparatus in claim 6 wherein the switch forming said power-change effectuator is connected to receive and, selectably, to pass the power-level change command signal generated by said comparator.

9. The apparatus of claim 8 wherein the sending station includes an attenuator that exhibits a selected level of attenuation and wherein, when the switch passes the power-level change command signal, the power-level change command signal is used to alter the level of attenuation of the attenuator.

10. The apparatus of claim 7 wherein positioning of the switch forming said power-change effectuator is determined by values of a power-change effectuation signal applied thereto, the power-change effectuation signal maintained in time-synchronization with the burst data signal.

11. The apparatus of claim 10 wherein the power-change effectuation signal is of a first value during the envelope-nonvarying portion of the burst data signal and is of a second value during the envelope varying portion of the burst data signal.

12. The apparatus of claim 11 wherein the communication system comprises a cellular communication system which provides for EDGE (enhanced data rate for GSM evolution) communications, wherein the burst data signal includes an EDGE-modulated burst including an amplitude-modulated portion and nonamplitude-modulated ramp portions and wherein said power-change effectuator selectably permits effectuation of change in the actual power levels at which the EDGE-modulated burst is transmitted.

13. In a method of communicating in a communication system having a sending station operable to send a burst data signal upon a communication channel during at least a selected interval, the burst data signal including an envelope varying component portion and an envelope-nonvarying component portion, an improvement of a method for controlling power levels at which the burst data signal is sent, said method comprising:

comparing values of indications of actual power levels at which the burst data signal is sent with values of a power control signal, the power control signal of values corresponding to the time-varying power-level values permitted of the burst data signal, the power control signal formed of a first signal portion and a second signal portion, the first signal portion of a first range of time-varying values and the second signal portion of a second range of time-varying values;

generating a power-level change command responsive to comparisons made during said operation of comparing; and selectably permitting effectuation of changes of the actual power levels at which the burst data signal is sent in manners corresponding to the power-level change command when the indications of the actual power levels at which the burst data signal is sent are of the envelop-nonvarying portion of the burst data signal.

14. The method of claim 13 wherein the power-level change command generated during said operation of generating comprises, alternately, a power-up command and a power-down command.

15. The method of claim 13 wherein the sending station comprises a power-level altering element and wherein said operation of selectably permitting comprises selectably connecting the power-level change command to the power-level altering element.

* * * * *